US012440044B2

(12) United States Patent
Caforio

(10) Patent No.: US 12,440,044 B2
(45) Date of Patent: Oct. 14, 2025

(54) SYSTEM FOR SUPPORTING THE HUMAN BODY, OR A HUMAN BODY SEGMENT, PROVIDED WITH AN IMPROVED CUSHIONING ARRANGEMENT

(71) Applicant: PRO MEDICARE S.R.L., Mesagne (IT)

(72) Inventor: Rosaria Eugenia Caforio, Mesagne (IT)

(73) Assignee: PRO MEDICARE S.R.L., Mesagne (IT)

( * ) Notice: Subject to any disclaimer, the term of this patent is extended or adjusted under 35 U.S.C. 154(b) by 887 days.

(21) Appl. No.: 17/642,681

(22) PCT Filed: Sep. 17, 2020

(86) PCT No.: PCT/IB2020/058667
§ 371 (c)(1),
(2) Date: Mar. 12, 2022

(87) PCT Pub. No.: WO2021/053572
PCT Pub. Date: Mar. 25, 2021

(65) Prior Publication Data

US 2022/0312984 A1 Oct. 6, 2022

(30) Foreign Application Priority Data

Sep. 17, 2019 (IT) ........................ 102019000016541

(51) Int. Cl.
*A47C 27/14* (2006.01)
*A47C 27/15* (2006.01)
*A61G 5/10* (2006.01)

(52) U.S. Cl.
CPC .......... *A47C 27/148* (2013.01); *A47C 27/142* (2013.01); *A47C 27/15* (2013.01); *A61G 5/1045* (2016.11)

(58) Field of Classification Search
CPC ..... A47C 27/142; A47C 27/148; A47C 27/15; A47C 7/021; A47C 7/185; A47C 7/425; A47C 20/02; A61G 5/1045; A61G 5/1091
(Continued)

(56) References Cited

U.S. PATENT DOCUMENTS 4,753,480 A * 6/1988 Morell ............... A61G 7/05715 297/DIG. 2
5,018,790 A * 5/1991 Jay ....................... A61G 5/1045 297/DIG. 6
(Continued)

FOREIGN PATENT DOCUMENTS

AU 2014284878 B2 * 5/2019 ............. A47C 31/12
WO WO-9210118 A1 * 6/1992 ........... A47C 27/001
WO WO-0158317 A1 * 8/2001 ........... A47C 27/081

OTHER PUBLICATIONS

International Search Report and Written Opinion of the International Searching Authority issued for International PCT Application No. PCT/IB2020/058667 on Nov. 3, 2020.

*Primary Examiner* — David R Hare
(74) *Attorney, Agent, or Firm* — Howson & Howson LLP

(57) ABSTRACT

A support system for the human body, or a human body segment, is provided. The system comprises a covering lining in which a plurality of pockets is defined in which there are inserted one or more filling elements forming together a cushioning arrangement of the support system. Filling elements with different physical properties, for example different stiffnesses, are inserted in the different pockets of the covering lining. The pockets may be independent of one another and removably connected to one another, so that they can be combined with one another in the way that best adapts to the specific morphology of a single user. The support system can be made, for example,
(Continued)

in the form a cushion, a seat, a backrest, a mattress or with any other shape that may be desired.

7 Claims, 4 Drawing Sheets

(58) Field of Classification Search
USPC .................................................. 5/654, 655.9
See application file for complete search history.

(56) References Cited

U.S. PATENT DOCUMENTS

| | | | | | |
|---|---|---|---|---|---|
| 5,038,432 | A * | 8/1991 | Robillard | A47G 9/10 | 5/645 |
| 5,524,640 | A * | 6/1996 | Lisak | A61F 5/0193 | 5/655 |
| 5,687,436 | A * | 11/1997 | Denton | A61G 5/1045 | 5/655.9 |
| 7,152,263 | B1 * | 12/2006 | Delfs | A47G 9/10 | 5/636 |
| 8,011,043 | B2 * | 9/2011 | Graebe | A47C 27/15 | 5/652 |
| 8,074,310 | B1 * | 12/2011 | Robbins | A47C 20/025 | 5/632 |
| 8,245,339 | B2 * | 8/2012 | Murray | A47G 9/10 | 5/657 |
| 8,713,733 | B2 | 5/2014 | Caforio | | |
| 9,572,738 | B2 * | 2/2017 | Haworth | A61G 7/07 | |
| 2016/0166080 | A1 | 6/2016 | Mascull et al. | | |
| 2018/0235374 | A1 * | 8/2018 | Kroll | A47C 7/425 | |

* cited by examiner

SYSTEM FOR SUPPORTING THE HUMAN BODY, OR A HUMAN BODY SEGMENT, PROVIDED WITH AN IMPROVED CUSHIONING ARRANGEMENT

TECHNICAL FIELD

The present invention relates to a system for supporting the human body, or a human body segment.

More particularly, the present invention relates to a system for supporting the human body, or a segment thereof, which has a modular structure adapted to conform to the specific morphology of a single user and his/her specific needs.

Even more particularly, the present invention relates to a system for supporting the human body, or a segment thereof, which is provided with an improved cushioning arrangement.

Said support system can, for example, be made in the form of a seat, suitable to be placed onto a support element, in the form of a backrest, suitable to be mounted between a pair of support uprights, in the form of a mattress, suitable to be mounted on a support frame, etc.

By way of non-limiting example, the present invention finds application in the making of support systems for ill or disabled people, and can be applied to medical devices for aiding mobility, such as manual and/or electronic wheelchairs, as well as to medical devices for rehabilitation and social or home life, such as bases with or without wheels for household and/or school use, etc.

More generally, the high modularity of the support system according to the invention makes it possible to adapt said system to all requirements and needs.

BACKGROUND ART

Correct posture is affected by countless factors and is essential for the physical well-being of the individual.

In particular, though without limitation, ensuring correct posture is essential to those people suffering from diseases, genetic or acquired, resulting from damage to the central nervous system, who do not have self-control mechanisms that, by reacting to external stimuli, would allow them to avoid assuming incorrect postures.

Some pathologies resulting from damage to the central nervous system also involve changes in body structure, which in turn lead to limitations of basic body functions, such as breathing, swallowing, communication, etc. For these people, a correct sitting or lying posture is even essential for their survival.

More generally, even for people who are in good health, there is a need for support systems for the human body that are adapted to the specific morphology of the individual and that allow them to maintain the correct posture, for example during work or during sleep hours.

Furthermore, the need is felt for such support systems—besides ensuring a correct posture—to guarantee optimum comfort to the user.

Support systems are known to the state of the art for supporting one or more human body segments that take into account the specific morphology of the single subject.

To this end, said support systems have a modular structure, consisting of a base element and one or more pluralities of interchangeable modules, each plurality of modules corresponding to a different body segment of the user.

In this way, the most suitable modules of each plurality of modules can be selected and correctly positioned on the base element, in order to obtain the final overall configuration most suitable for correct support and restraint of the subject.

By way of example, International patent application WO 2011/148329, in the name of the same Applicant, describes a postural system having a wholly modular nature and providing a support structure (base element) made as a flat base plate, and several pluralities of shaped modular elements (blocks), provided with means for removable and reversible connection to said base plate and to one another. In this way, the number, shape and arrangement of said shaped blocks can be chosen each time according to the morphology of the individual user.

The postural system described in WO 2011/148329 also comprises a cushioning, arranged on the side oriented towards the user. In particular, also the cushioning of the postural system can have a modular structure, consisting of a plurality of cushions made of a foamed material and having different shapes and sizes, whereby also the cushioning can be configured so as to conform to the specific morphology of the single user.

Although a support system of the type described above can take on a configuration that perfectly conforms to the specific morphology of the individual and can be modified over time if that morphology changes, it is not without drawbacks.

In particular, although the modular blocks can be configured so as to conform to the specific morphology of the single user, they are all made of the same material; by way of example, they can be made of a plastic or composite material which can be shaped by cutting, material removal or other similar working processes.

More particularly, said blocks are all made of a material having the same given stiffness.

Similarly, the cushioning of said postural system, evens if it has a modular, customizable structure, consists of cushions of foamed material that are all made of the same material; by way of example, they can be made of high-performance polymer foams, cross-linked foams to promote ventilation, visco-elastic slow rebound memory foams and similar materials.

In particular, said cushions are all made of a material having the same given stiffness.

Conversely, manufacturing, for each modular block with a given shape and size, a plurality of items made of different materials and with different stiffnesses would be unfeasible for reasons of complexity and production costs.

Similarly, manufacturing, for each padded cushion with a given shape and size, a plurality of items made of different materials and with different stiffnesses would be unfeasible for reasons of complexity and production costs.

The object of the present invention is therefore to overcome the limitations set forth above by providing a system for supporting the human body, or a human body segment, that has regions with different stiffnesses, in order to simultaneously achieve optimum support for the corresponding segment of the user's body and maximum possible comfort.

More particularly, it is an object of the present invention to provide a system for supporting the human body, or a human body segment, that takes into account the fact that—depending on the specific morphology of the single user—it may be necessary to make some regions with higher stiffness, in order to guarantee better support to the user, and other regions with lower stiffness, in order to provide more comfort.

A further object of the present invention is to provide a support system that can be adapted to support any segment of the human body, while ensuring that said system can in any case conform to the morphology and need of the single individual.

These and other objects are achieved by a support systems as claimed in the appended claims.

SUMMARY OF INVENTION

The support system according to the invention comprises a covering lining in which a plurality of pockets are defined, inside each of which one or more filling elements can be inserted.

Said filling elements can have different physical properties (in particular, different stiffnesses), and form together a cushioning arrangement with regions with differentiated stiffness, which allows improving the user's comfort.

U.S. Pat. No. 7,152,263 describes a cushion comprising a top layer and a bottom layer, wherein the top layer is divided into four separate compartments and the bottom layer is divided into three separate compartments, wherein each compartment of the top layer and/or of the bottom layer can be filled with different filling elements.

However, the cushion described in U.S. Pat. No. 7,152,263 has limited degrees of freedom: first of all, it is intended to support the head of an individual, and it cannot be adapted to other, different segments of the human body; secondly, it is intended to take on only two different configurations, one for those individuals who sleep on their back and one for those individuals who sleep on their side.

As a result, the teachings of U.S. Pat. No. 7,152,263 do not lend themselves to the making of complex support systems, in particular for those people who, having no self-control mechanisms that, by reacting to external stimuli, would allow them to avoid assuming incorrect postures, need support and postural systems for support and restraint of different body segments.

WO 92/10118 describes a device for supporting the body comprising a cushion or mattress that is divided into compartments that can be filled with different filling elements.

In this case too, however, the device described in WO 92/10118 has very limited degrees of freedom, because it is essentially intended to compensate for possible asymmetries between the right and left halves of the body.

Therefore, not even the teachings of WO 92/10118 lend themselves to the realization of complex support systems, able to ensure the support, restraint and control of the different body segments, whatever their morphology.

WO 01/58317 describes a cushion for application to the surface of pieces of furniture, which cushion comprises a body in which a plurality of pockets are formed. Said cushion is further provided with means for being connected to other similar cushions.

Also the cushion structure described in WO 01/58317 does not lend itself to the making of a structure that takes into account the particular morphology of the individual subject. Furthermore, the modularity of the cushion described is only suitable for covering different surfaces with a plurality of equal or similar elements connected to one another, but it does not allow adaptation to different body segments or, with the same body segment, to different individual morphologies.

The invention relates, instead, to a complex support system that can be adapted to any human body segments as well as to the specific morphology of each individual.

In particular, in a preferred embodiment of the invention, the support system according to the invention comprises a covering lining in which a plurality of pockets are defined which are removably connected to one another, wherein one or more filling elements can be inserted in each of said pockets.

Thanks to the fact that the pockets are removably connected to one another, they can be combined in a plurality of different configurations, which provides very high versatility for the support system according to the invention.

In particular, said support system can be adapted to the specific morphology of any segments of the body of the single user.

For this purpose, the pockets are provided, along their perimeter or part thereof, with interconnecting means adapted to cooperate with the interconnecting means provided on the adjacent pockets.

It is clear that, preferably, the covering lining of the support system according to the invention can provide for pockets that are shaped each time in a different way depending on the different body segment for which the support system is intended.

However, this measure per se allows "gross adjustment" to the user's morphology. The possibility of combining the pockets in a plurality of different configurations, instead, provides for the possibility of a second "finer" level of adjustment of the support system to the single user.

In a particularly simple embodiment of the invention, the covering lining comprises a first outer wall and a second outer wall opposite to said first outer wall.

The first outer wall and the second outer wall define therebetween an inner space, which is divided into a plurality of separate pockets, wherein each of said pocket can be filled with different filling elements.

In a preferred embodiment of the invention, the covering lining comprises a first outer wall and a second outer wall, opposite to said first outer wall, and further comprises one or more inner intermediate walls, which are arranged between said first outer wall and said second outer wall.

In this embodiment as well, the first outer wall and the second outer wall define therebetween an inner space, which is divided into a plurality of separate pockets. Furthermore, said intermediate walls provide each pocket with a multilayer structure, wherein each layer of each pocket can be filled with a filling element having different properties (in particular, different stiffnesses).

For example, in this preferred embodiment of the invention, each of said pockets can have at least one filling element with higher stiffness, arranged in the layer of the inner space of said covering lining which, in use, is the farthest from the user's body, and at least one filling element with lower stiffness, arranged in the layer of the inner space of said covering lining which, in use, is the closest to the user's body.

The aforesaid filing elements can be made with any stiffness and of any suitable material.

In particular, they can be made of a substantially rigid material and be shaped so as to conform to the specific morphology of the user, or they can be made of a substantially soft material, such as a formed material; or they could be made as deformable elements (for example, made of gel), which take on a shape which depends on the user's morphology.

Advantageously, the invention allows inserting filling elements with different stiffnesses into different pockets (and into different layers of the same pocket, where provided for).

In this way, depending on the specific morphology of the single user, it will be possible to insert filling elements with higher stiffness into some pockets—in which more support is required—and filling elements with lower stiffness into other pockets—where it is preferable to give priority to the user's comfort.

In addition, where the cushioning arrangement of the support system according to the invention has a multilayer structure, each of said pockets may have one or more filling element(s) with higher stiffness arranged in those layers of the inner space of said covering lining which, in use, are farther from the user's body, and one or more filling elements with lower stiffness arranged in the layers of the inner space of said covering lining which, in use, are closer to the user's body.

In the case that the pockets are also coupled to one another in a removable way, the specific morphology of the individual user can be taken into account both when deciding how the pockets are combined with each other and when deciding how each pocket (or each layer of each pocket) is filled.

Advantageously, the pockets of the covering lining of the support system according to the invention are provided with zippers or similar openable closure means, in order to allow access to said pockets and replacement of the filling elements contained therein; this is the case, for example, when it is necessary to effect adjustments or when it is necessary to change the configuration of the support system over time because of changes in the user's morphology.

Preferably, the covering lining of the support system according to the invention provides pockets which are shaped differently each time according to the different body segment for which the support system is intended.

BRIEF DESCRIPTION OF DRAWINGS

Further features and advantages of the invention will become apparent from the ensuing description of a preferred embodiment of the invention, given by way of non-limiting example, with reference to the annexed drawings, in which.

DESCRIPTION OF EMBODIMENTS

In the ensuing description of a preferred embodiment of a support system for supporting the human body according to the invention, reference will be made to a support system made in the form of a head cushion.

However, this embodiment should not be interpreted in a limiting sense and the support system according to the invention could be realized in many different ways, each one capable of supporting one or more body segments of the user.

For example, the support system according to the invention could be made in the form of a seat, in the form of a backrest, in the form of a mattress, in the form of an armchair including a seat and a backrest, or in many other forms, as will be highlighted below.

Figure 1:
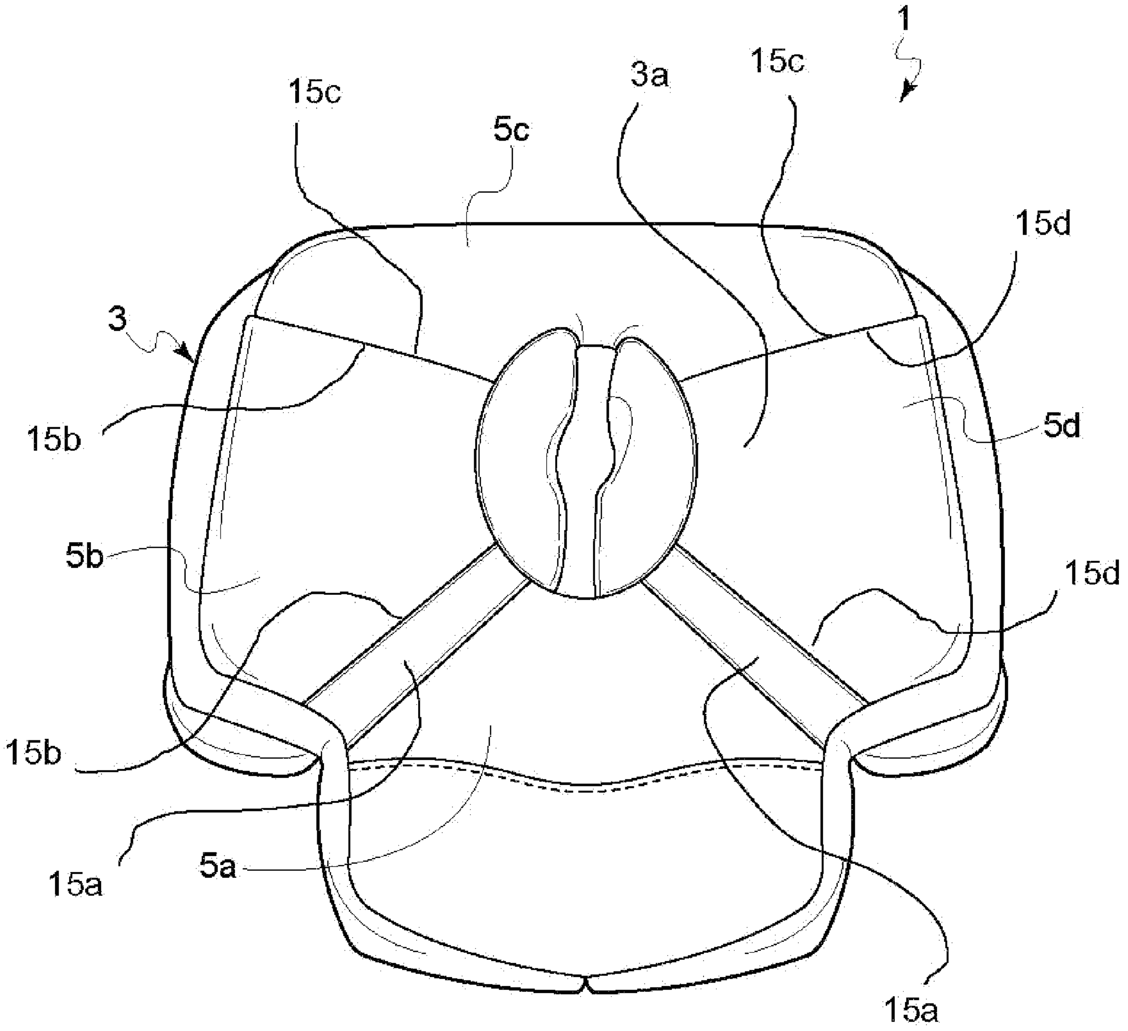
FIG. 1 is a top view of the support system according to a preferred embodiment of the invention.
Figure 2:
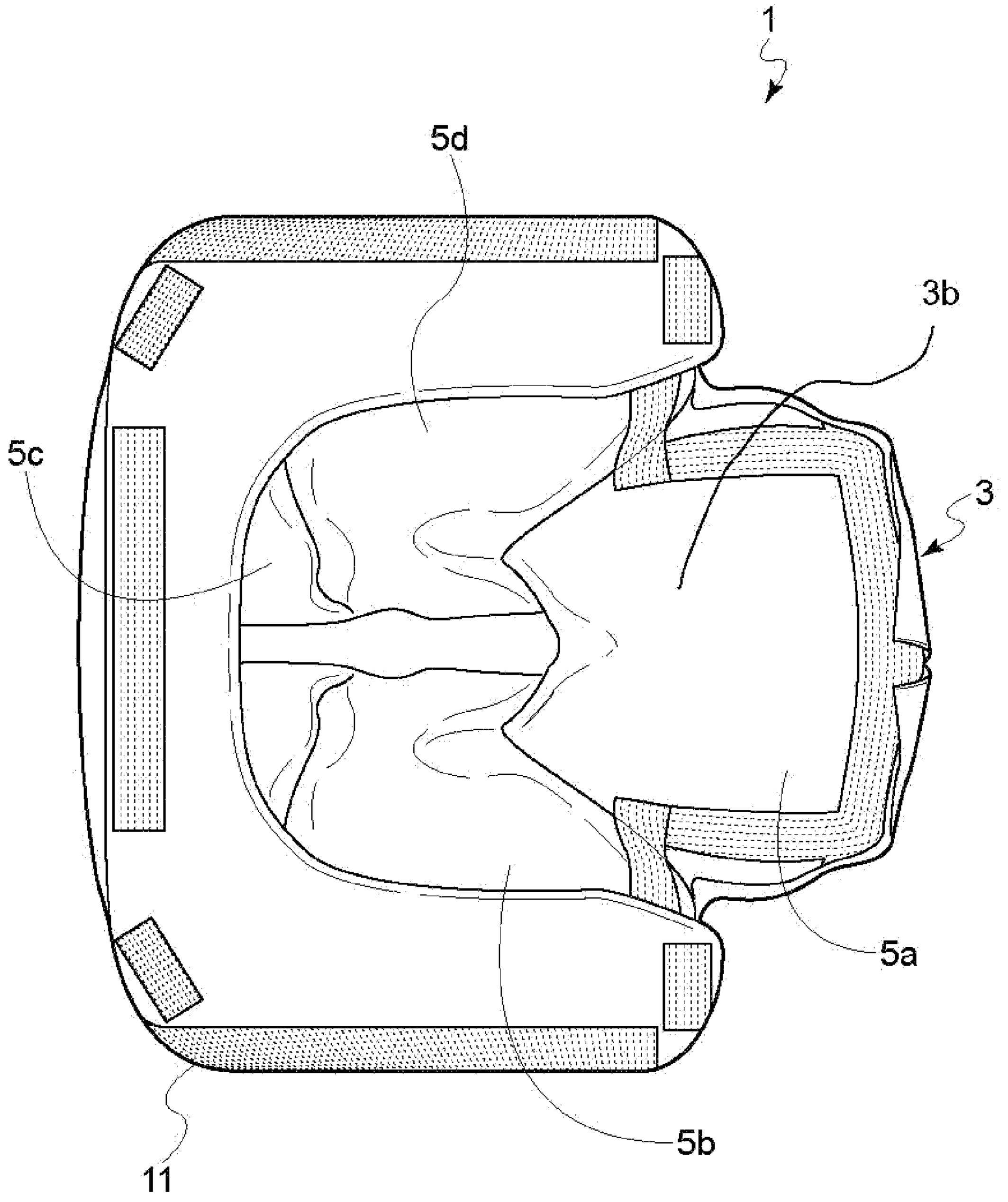
FIG. 2 is a bottom view of the support system of FIG. 1.

Referring to FIGS. 1 and 2, in the illustrated embodiment, the support system is in the form of a head cushion 1.

Said cushion 1 comprises a covering lining 3, for example made of a strong textile material.

The covering lining 3 comprises a first outer wall **3*a* and a second outer wall 3*b***, which walls define therebetween an inner space adapted to receive a cushioning pad.

According to the invention, within the inner space of the covering lining 3 there are provided a plurality of pockets—in particular four pockets **5*a*, 5*b*, 5*c*, 5*d* in the embodiment illustrated in FIGS. 1 and 2**—separated from one another.

For example, the pockets **5*a*, 5*b*, 5*c*, 5*d*** may be separated from one another by means of stitching or by means of an adhesive, or also by means of welding in the case of hot-melt materials.

However, in a preferred embodiment of the invention, said pockets **5*a*, 5*b*, 5*c*, 5*d*** are independent of and removably connected to one another.

For this purpose, each pocket **5*a*, 5*b*, 5*c*, 5*d* is provided, along its perimeter or part thereof, with interconnecting means 15*a*, 15*b*, 15*c*, 15*d*** adapted to cooperate with the interconnecting means of the adjacent pockets in order to establish a removable connection between said pockets.

In this way, the number, type and relative position of each pocket with respect to the other pockets can be selected each time so that they can adapt optimally to the specific morphology of the single user.

According to the invention, different filling elements, i.e. filling elements with different physical properties, can be inserted inside each of said pockets. In particular, filling elements with different stiffnesses can be inserted inside each of said pockets.

In the preferred embodiment of the invention illustrated in the Figures, the covering lining 3 comprises, besides the first and second outer walls **3*a*, 3*b*, one or more intermediate walls 3*c* (in the illustrated embodiment, one intermediate wall 3*c*** only).

The provision of said intermediate wall give each pocket **5*a*-5*d*** a multilayer structure, wherein each layer can receive a different filling element.

In particular, a different filling element with different physical properties, for example with different stiffness, can be inserted into each layer of each pocket.

Figure 3:
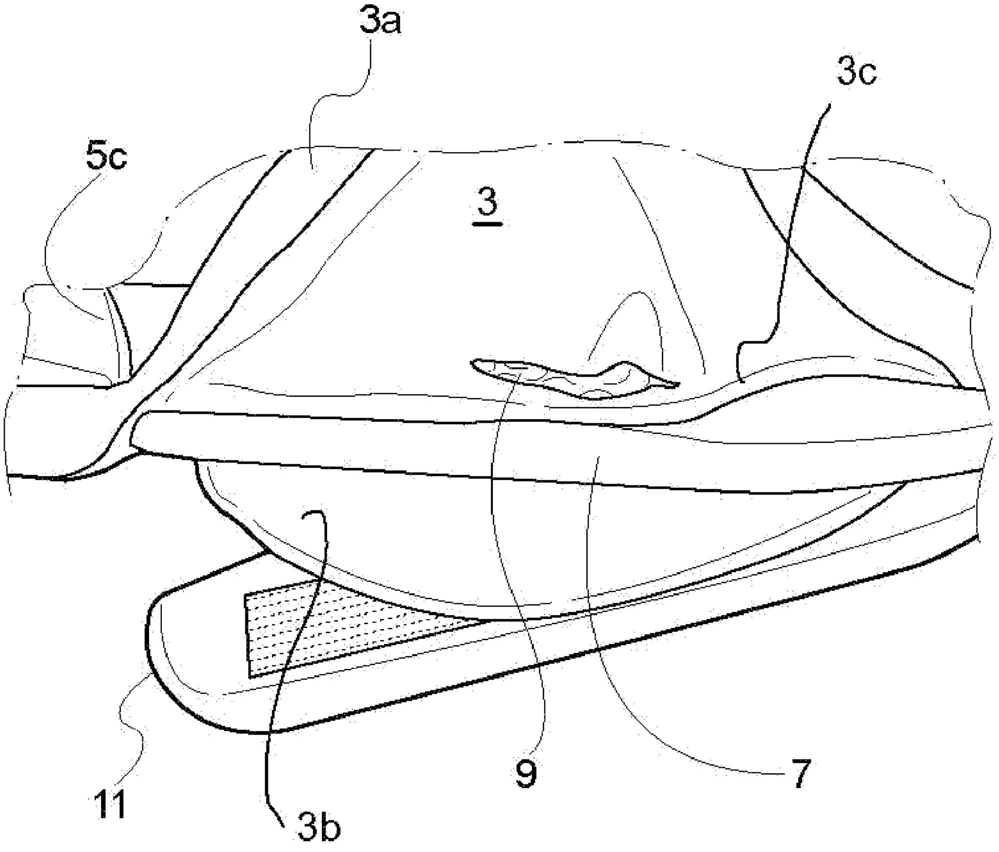
FIG. 3 is a representation of the insertion of filling elements of the cushioning arrangement into the covering lining of the support system according to the invention.
Figure 4:
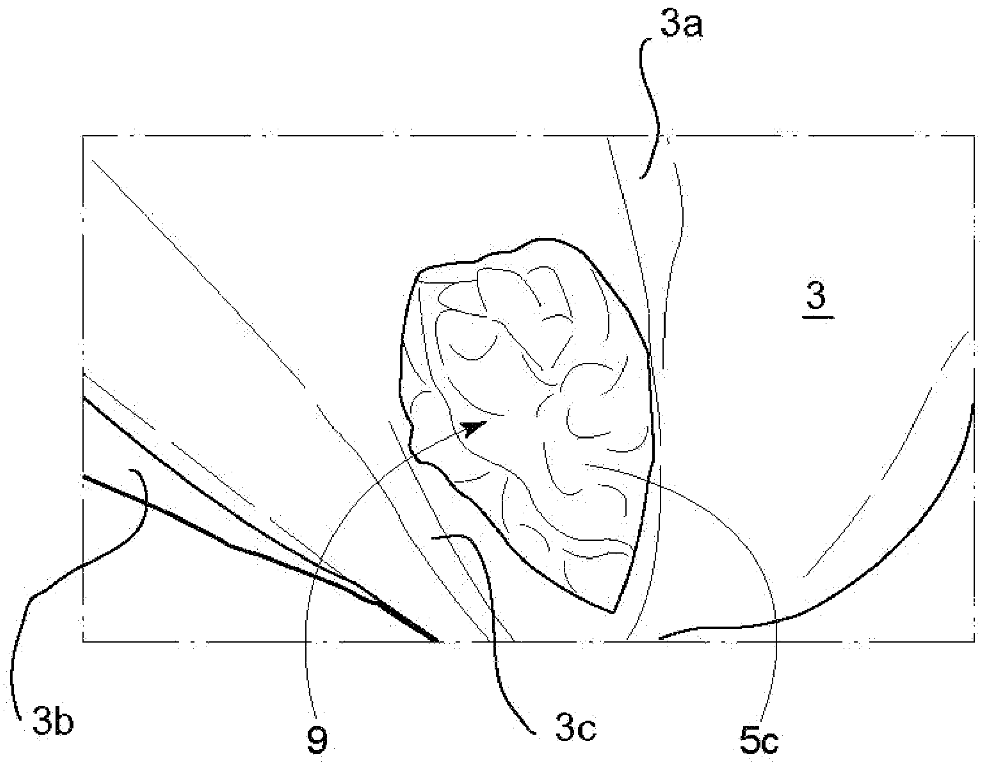
FIG. 4 is another representation of the insertion of filling elements of the cushioning arrangement into the covering lining of the support system according to the invention.

For example, as best seen in FIGS. 3 and 4, in each layer of each of said pockets **5*a*-5*d* there can be provided filling elements 7, 9**, which are superimposed on one another to form a cushioning arrangement with a multilayer structure.

By way of example, said multilayer structure could include at least one filling element with higher stiffness 7, arranged in a layer adjacent to the side of said covering lining 3 which, in use, is the side farthest from the user's body.

Said multilayer structure could further include at least one filling element with lower stiffness 9, arranged in a layer adjacent to the side of said covering lining 3 which, in use, is the side closest to the user's body.

Advantageously, according to the invention, filling elements 7,9 with different stiffnesses can be inserted into different pockets **5*a*-5*d* and, where the covering lining 3 comprises one or more intermediate inner walls 3*c***, into different layers of the same pocket.

In this way, if—according to the specific morphology of the single user and/or according to the specific needs of the single application—more support is required at a certain region, filling elements 7, 9 with higher stiffness can be inserted into the respective pocket; in particular, the filling element 9, which is the closest to the user's body, will be selected with higher stiffness.

If, instead—again according to the specific morphology of the single user and/or according to the specific needs of the single application—more comfort is required at a certain region, filling elements 7, 9 with lower stiffness can be inserted into the respective pocket; in this case, too, the filling element 9, which is the closest to the user's body will be selected, in particular, with lower stiffness.

The filling elements 7,9 can be made of any suitable material, such as, for example, plastic and composite materials, foamed materials or also deformable materials (for example, gels).

In a particularly preferred embodiment of the invention, said filling elements 7, 9 consist of small pieces, having the same size and shape or different sizes and shapes, of polymer foams, which are the same or different from one another.

The possibility to combine small pieces of polymer foams with different sizes and shapes remarkably increases the degrees of freedom and brings about the realization of a support system with practically countless combinations depending on the application and the user's needs.

Advantageously, the pockets 5*a*-5*d* of the covering lining 3 are provided with openable closure means, such as for example zippers, in order to allow access to said pockets and replacement of the filling elements contained in said pockets.

As visible in FIGS. 2 and 3, on the side which, in use, is the side farthest from the user's body, the covering lining 3 of the cushion 1 can then be coupled (preferably by means of removable coupling means, such as, for example, male/female hook-and-loop strips) to a universal support 11, which in turn is designed for coupling to the frame of a wheelchair or similar medical support device for mobility or rehabilitation.

Said universal support can have any shape and be made of any material; in particular, it can be either rigid or flexible.

It is clear that the embodiment described above has been provided merely by way of example and that numerous modifications and variations are possible without leaving the scope of protection of the invention, as defined by the appended claims.

It is further clear that several support systems according to the invention can be combined with one another in order to provide a complex support structure, in which each element benefits from the technical advantages of the invention highlighted above.

Therefore, in the case where the pockets are removably connected with each other, a dual-modularity level is achieved: a support system having a modular structure, consisting of a plurality of separate pockets combinable with one another, and a support system having a modular structure consisting of a plurality of separate support systems combinable with one another.

The invention claimed is:

1. A support system for supporting the human body or a human body segment, the support system comprising:

a covering lining, the covering lining comprising a first outer wall and a second outer wall, opposite to the first outer wall, wherein the first and second outer walls define therebetween an inner space of the covering lining, wherein the inner space of the covering lining is divided into a plurality of pockets, which are mutually separated, wherein one or more filling elements are inserted inside each of the pockets, wherein filling elements having different physical properties are received in different pockets of the inner space of the covering lining of the support system, wherein the covering lining comprises one or more inner intermediate walls, which are arranged between the first outer wall and the second outer wall of the covering lining, wherein, due to provision of the one or more inner intermediate walls, the pockets have a multilayer structure comprising several layers, wherein filling elements having different physical properties are received in different layers of each of the pockets of the inner space of the covering lining of the support system, wherein the pockets are independent of one another and removably connected to one another, and wherein the pockets are provided, along their perimeter or part thereof, with interconnecting means adapted to cooperate with the interconnecting means of the adjacent pockets in order to establish a removable connection between the adjacent pockets.

2. The support system according to claim 1, wherein the multilayer structure of the pockets comprises at least one filling element with higher stiffness, arranged in a layer adjacent to a side of the covering lining which, in use, is farthest from a user's body, and at least one filling element with lower stiffness, arranged in a layer adjacent to a side of said covering lining which, in use, is closest to the user's body.

3. The support system according to claim 1, wherein the filling elements comprise small pieces of polymer foams.

4. The support system according to claim 1, wherein the pockets of the inner space of the covering lining are provided with openable closure means.

5. The support system according to claim 1, wherein the covering lining is coupled, at one of the first or second outer walls, to a universal support.

6. The support system according to claim 5, wherein the covering lining is coupled to the universal support by means of hook-and-loop elements.

7. The support system according to claim 4, wherein the pockets of the inner space of the covering lining are provided with zippers.

* * * * *